(12) United States Patent
Xu et al.

(10) Patent No.: US 12,346,321 B2
(45) Date of Patent: Jul. 1, 2025

(54) METHOD AND APPARATUS FOR QUERYING SIMILAR VECTORS IN A CANDIDATE VECTOR SET

(71) Applicant: MONTAGE TECHNOLOGY CO., LTD., Shanghai (CN)

(72) Inventors: Song Xu, Shanghai (CN); Lanxin Zhang, Shanghai (CN); Yufeng Qu, Shanghai (CN); Chunyi Li, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 49 days.

(21) Appl. No.: 17/718,983

(22) Filed: Apr. 12, 2022

(65) Prior Publication Data

US 2022/0327128 A1    Oct. 13, 2022

(30) Foreign Application Priority Data

Apr. 13, 2021   (CN) .......................... 202110393852.1

(51) Int. Cl.
   *G06F 16/2453*   (2019.01)
(52) U.S. Cl.
   CPC .. *G06F 16/24542* (2019.01); *G06F 16/24539* (2019.01)
(58) Field of Classification Search
   CPC ......... G06F 16/24542; G06F 16/24539; G06F 17/18; G06F 16/332; G06F 16/355; G06N 20/00
   See application file for complete search history.

(56) References Cited

U.S. PATENT DOCUMENTS

| | | | |
|---|---|---|---|
| 2012/0275516 A1* | 11/2012 | Tanaka | H04N 19/50 375/E7.243 |
| 2019/0236167 A1* | 8/2019 | Hu | G06F 16/24578 |
| 2019/0251184 A1* | 8/2019 | Shan | G06N 3/045 |
| 2019/0288551 A1* | 9/2019 | Tsubota | G05B 13/042 |
| 2019/0349045 A1* | 11/2019 | Varatharaajan | H04B 7/0469 |
| 2019/0372760 A1* | 12/2019 | Zheng | H04L 9/0894 |
| 2020/0162729 A1* | 5/2020 | Lee | H04N 19/18 |
| 2020/0311077 A1* | 10/2020 | Zhang | G06F 3/068 |

FOREIGN PATENT DOCUMENTS

CN    111859004 A    10/2020

* cited by examiner

*Primary Examiner* — Ann J Lo
*Assistant Examiner* — Fernando M Mari Valcarcel
(74) *Attorney, Agent, or Firm* — Junhe Law Office P.C.; James J. Zhu

(57) ABSTRACT

A method for querying in a candidate vector set candidate vectors similar to object vectors is disclosed, wherein the candidate vector set comprises a plurality of candidate vectors each being quantized as having a central vector portion and a residual vector portion, the method comprising: querying, a first number of candidate vector subsets that are closest to the object vector; generating and storing a plurality of common calculation results based on a set of central vector portions and a set of residual vector portions of candidate vectors of the first number of candidate vector subsets; generating and storing pre-calculation results based on the set of object vectors and the set of residual vector portion; and determining, a second number of candidate vectors that are similar to each object vector in the corresponding first number of candidate vector subsets based on the stored pre-calculation results and common calculation results.

8 Claims, 4 Drawing Sheets

METHOD AND APPARATUS FOR QUERYING SIMILAR VECTORS IN A CANDIDATE VECTOR SET

TECHNICAL FIELD

The present application generally relates to computer technology, specifically, to a method and apparatus for querying similar vectors in a candidate vector set.

BACKGROUND

Similarity querying of vectors needs to be performed by a high-performance computing device, so currently, it is mainly processed by data processing devices with strong computing capabilities such as a central processing unit and a graphics processor. However, central processing units and graphics processors are usually designed to meet the requirements of general computing, and they are less specific for the specific application of similarity querying of vectors, and there is no additional hardware optimization for similarity querying of vectors.

Therefore, it is desired to provide an apparatus and method to efficiently perform vector similarity querying.

SUMMARY

An objective of the present application is to solve the technical problem of low processing efficiency caused by the poor specificity of existing equipment for similar vector querying.

In an aspect of the present application, a method for querying in a candidate vector set candidate vectors similar to object vectors, wherein the candidate vector set comprises a plurality of candidate vectors each being quantized as having a central vector portion and a residual vector portion, and the candidate vector set comprises a plurality of candidate vector subsets, the method comprising: acquiring a set of object vectors; querying, for each object vector of the set of object vectors, a first number of candidate vector subsets that are closest to the object vector; generating and storing a plurality of common calculation results based on a set of central vector portions and a set of residual vector portions of candidate vectors of the first number of candidate vector subsets; generating and storing pre-calculation results based on the set of object vectors and the set of residual vector portion; and determining, for each object vector of the set of object vectors, a second number of candidate vectors that are similar to the object vector among the candidate vectors in the corresponding first number of candidate vector subsets based on the stored pre-calculation results and common calculation results.

In some embodiments, the generation of the plurality of common calculation results is performed offline, and the generation of the pre-calculation results is performed online.

In some embodiments, the pre-calculation results are stored as a pre-calculation result table in the form of a look-up table.

In some embodiments, the steps for determining, for each object vector of the set of object vectors, a second number of candidate vectors that are similar to the object vector among the candidate vectors in the corresponding first number of candidate vector subsets based on the stored pre-calculation results and common calculation results comprises: calculating, for each object vector, respective distances between the object vector and the candidate vectors in the corresponding first number of candidate vector subsets; and sorting the candidate vectors based on the calculated distances, to determine a second number of candidate vectors that are closest to the object vector as the second number of candidate vectors that are similar to the object vector.

In some embodiments, each of the central vector portions, the residual vector portions, and the object vectors are divided into M segments using IVF-PQ algorithm, wherein M is a natural number greater than 1, and a common calculation result is expressed as: $(xq-C_i)^2+(pq\_centroids(k,l))^2+2*(C_i|pq\_centroids(k,l))$, wherein xq denotes an object vector, and pq_centroids(k,l) denotes a residual vector portions, l denotes an l-th segment of a residual vector portion, l=1 ... M, and k denotes a quantized value of the l-th segment of a residual vector portion; Ci denotes the i-th central vector portion associated with a candidate vector, and i is a natural number.

In some embodiments, a pre-calculation result is expressed as: $-2(xq|pq\_centroids(k,l))$.

In other aspect of the present application, A similarity query apparatus for querying in a candidate vector set candidate vectors similar to object vectors, wherein the candidate vector set comprises a plurality of candidate vectors each being quantized as having a central vector portion and a residual vector portion, and the candidate vector set comprises a plurality of candidate vector subsets, the similarity query apparatus comprising: a calculation module for calculating respective distances between an object vector and the plurality of candidate vectors subsets, and for calculating respective similarities between candidate vectors and an object vector; and a sorting module for sorting the distances between an object vector and the plurality of candidate vector subsets, and for sorting the similarities between candidate vectors and an object vector, wherein the calculation module performs the calculating of distances and similarities through the following steps: acquiring a set of object vectors; and for each object vector of the set of object vectors: calculating respective distances between the object vector and the candidate vector subsets and providing the distances to the sorting module; generating and storing a plurality of common calculation results based on a set of central vector portions and a set of residual vector portion of the candidate vectors of a first number of candidate vector subsets that are closest to the object vector; generating and storing pre-calculation results based on the set of object vectors and the set of residual vector portions; and determining a second number of candidate vectors that are similar to the object vector among the candidate vectors in the corresponding first number of candidate vector subsets based on the stored pre-calculation results and common calculation results.

For the method and apparatus for querying similarity vectors according to the embodiments of the present application, when calculating the similarity between each candidate vector and each object vector, it is obtained by querying the pre-calculated and stored common calculation results and pre-calculation results without repeated calculation, which simplifies the complex vector calculations into query operations, thereby effectively improving calculation efficiency.

The foregoing is an overview of the present application, which may simplify, summarize, and omit details. Those skilled in the art will appreciate that this section is merely illustrative and not intended to limit the scope of the present application in any way. This summary is neither intended to identify key features or essential features of the claimed subject matter nor intended to act as an auxiliary means for determining the scope of the claimed subject matter.

BRIEF DESCRIPTION OF THE DRAWINGS

The foregoing and other features of the present application will be more fully understood from the following description and the appended claims taken in conjunction with the accompanying drawings. It is to be understood that these drawings depict only a few embodiments of the contents of the present application and should not be construed as limiting the scope of the present application. The contents of the present application will be illustrated more clearly and in more detail with the accompanying drawings.

DETAILED DESCRIPTION OF THE EMBODIMENTS

Figure 1:
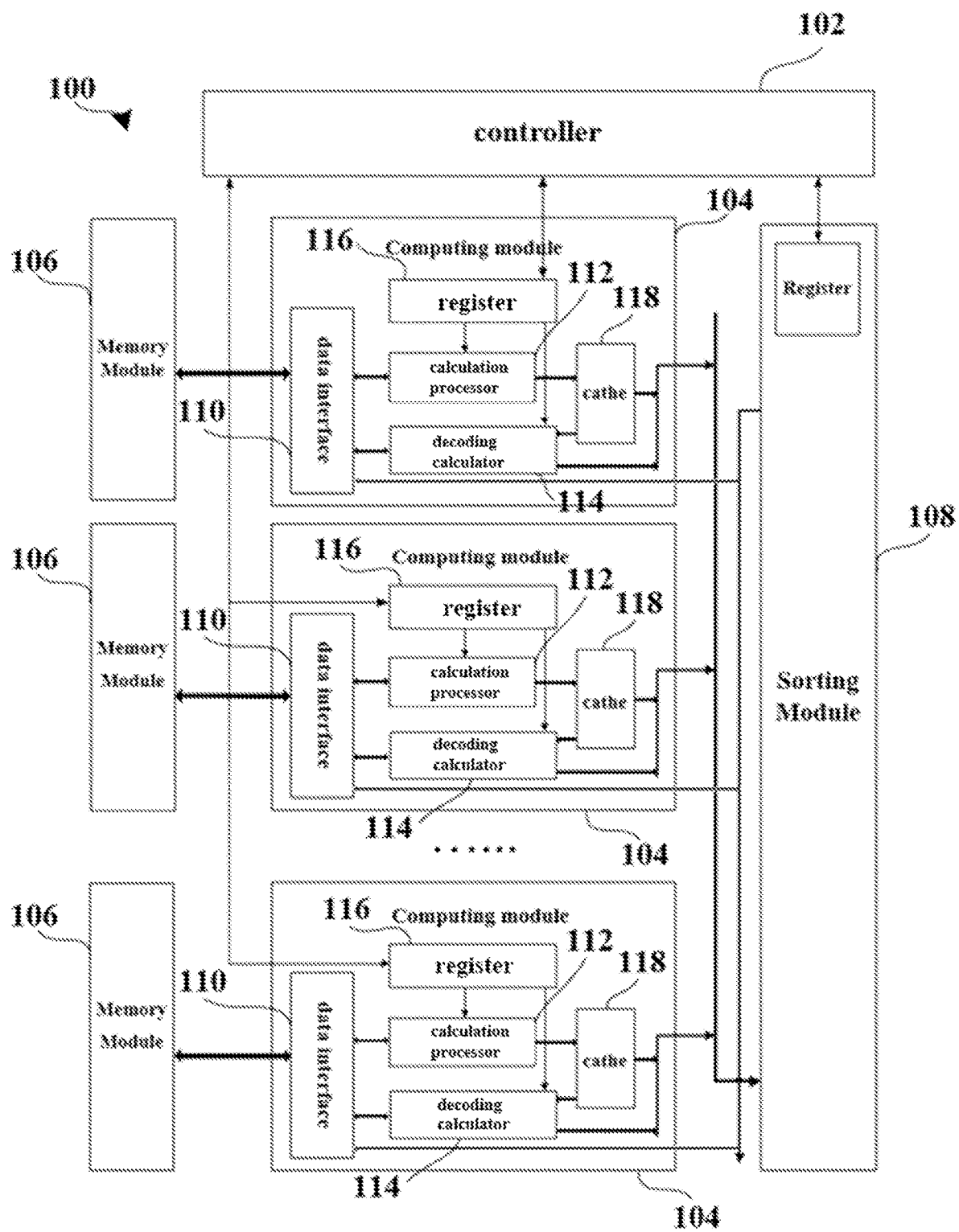
FIG. 1 shows an apparatus 100 for querying in a candidate vector set candidate vectors similar to object vectors according to an embodiment of the present application.

In the following detailed description, reference is made to the accompanying drawings which form a part hereof. In the drawings, similar reference numbers generally refer to similar parts unless the context clearly dictates otherwise. The illustrative embodiments described in the detailed description, drawings, and claims are not intended to be limiting. Other embodiments may be employed and other changes may be made without departing from the spirit or scope of the subject matter of the present application. It will be appreciated that various configurations, substitutions, combinations, and designs of the various forms of the present application, which are generally described in this application and are illustrated in the drawings, are intended to constitute a part of the present application.

Faiss is a technology for processing large-scale multi-dimensional vectors similarity retrieval (or proximity retrieval), which can train a plurality of original vectors and establish associated index files. Generally, after creating index files, a similar vector of a certain object vector can be retrieved based on index files, which can effectively improve retrieval efficiency.

Inverted File System-Product Quantizer (IVF-PQ) is a specific Faiss algorithm that can convert each original vector into a value denoted by a centroid. In some examples, the original vector can also be divided into segments and each segment can be represented a value denoted by a centroid using the IVF-PQ algorithm. Taking a vector set including 128-dimensional vectors as an example, each of the 128-dimensional original vectors can be divided into M segments (for example, 4 segments), and then the first segment of all original vectors are clustered and L centroids (for example, 256 centroids) may be obtained, and the second segment of all original vectors are clustered similarly and L centroids may be obtained . . . until L centroids of the M-th segment may be obtained. The nearest centroid corresponding for each segment of each original vector can be found. In this way, each original vector can be quantized from the original 128-dimensional vector into M numbers and M residuals. The "number" of a pair of number and residual represents the number of a centroid closest to a segment in the original vector. The "residual" of a pair of number and residual represents the distance between the segment in the original vector and the closest centroid. In the subsequent calculation process, only the number of the encoded vector is transmitted, and the data that is transmitted becomes less. In some embodiments, the residuals can be similarly further quantized.

It can be understood that after the original vectors are converted into centroids, the vector set can be divided into a plurality of vector subsets based on different centroids, where each of the vector subsets includes all vectors represented by a centroid. More specifically, these vectors can be represented by a centroid and respective residual, the difference between these vectors lies in the value of the residuals.

In other cases, the original vectors may not be divided, but all the original vectors may be directly clustered and quantization processing may be performed, and each quantized original vector is expressed as a pair of centroids and residuals.

When performing similarity retrieval, it is necessary to calculate the similarity between the candidate vectors and object vectors in the vector set, that is, to calculate the distance between the two. In order to reduce the amount of calculation of the similarity between object vectors and the candidate vectors in the vector set, N centroids (that is, top N centroids) that are closest to object vectors can be firstly calculated and determined in the IVF-PQ algorithm. Since each of the top N centroids can represent a certain number of vectors (that is, some vectors that are closest to the centroid), these vectors respectively constitute a vector subset related to the corresponding centroid (each vector subset can be represented by the corresponding centroid and the residuals), which constitutes a total of top N vector subsets. In this way, only the similarity between object vectors and the vector represented by the top N centroids can be calculated later, that is, only the similarity between object vectors and the candidate vectors in the top N vector subsets represented by the top N centroids can be calculated. It can be seen that this retrieval method greatly reduces the amount of calculation for similarity. In practical applications, the number of N centroids that need to be determined depends on the data used in the application, and those skilled in the art can adjust it according to factors such as the condition and type of data of a vector set, and the processing capability of the hardware device.

The inventor of the present application found that in the above-mentioned IVF-PQ algorithm, the calculation of the distance between an object vector and a centroid can be expressed by equation (1):

$$d(xq, xb[ib]) \approx d(xq, C_i + \text{pq\_centroids}(k, l)) = \\ (xq - C_i - \text{pq\_centroids}(k, l))^2 = \\ (xq - C_i)^2 + (\text{pq\_centroids}(k, l))^2 + \\ 2*(C_i|\text{pq\_centroids}(k, l)) - 2(xq|\text{pq\_centroids}(k, l)) \quad \text{equation (1)}$$

Wherein, xq denotes an object vector; xb[ib] is a candidate vector in the converted candidate vector set, function d(a, b) denotes a distance between vectors a and b (similarity); $C_i$ denotes the i-th centroid (or the central vector) associated with the candidate vector xb[ib], that is, the centroid corresponding to the vector subset to which the candidate vector beloas; and pq_centroids(k,l) denotes an residual vector Res between the candidate vector xb[ib] and the centroid $C_i$, wherein the residual vector and object vector are optionally divided into M segments (based on the IVF-PQ algorithm), M is a natural number and divides the dimension candidate vector (that is each segment has equal dimension), therefore l denotes the l-th segment of the residual vector, and k denotes a quantized value of the l-th segment. The expression (xq|pq_centroids(k,l)) denotes that the M segments of the object vector will be multiplied and accumulated by the corresponding M segments of the residual vectors.

However, the two expressions in the above equation (1) (pq_centroids(k,l))$^2$+2*($C_i$|pq_centroids(k,l)) has nothing to do with the object vector xq. In other words, the calculation results of these two expressions are the same for different object vectors, and the difference lies only in the calculation results of the other two expressions in equation (1). In practical applications, object vectors are generally input in batches, that is, a plurality of object vectors are input in one batch, and then a plurality of the candidate vectors that are similar to the object vectors are queried together in the candidate vector set. After querying, the next batch of object vectors are input and are performed the same processing. Therefore, when calculating the similarity of each batch of object vectors, the first expression in equation (1) is usually certain.

Although the last expression (pq_centroids(k,l))$^2$+2*($C_i$|pq_centroids(k,l)) in Equation (1) is related to object vectors xq. However, as mentioned above, since each candidate vector is quantized to include a residual vector portion, and the number of quantized residual vector portions are usually limited, when calculating the similarity of each batch of object vectors, the calculation will be repeated many times. Therefore, the result of the expression −2(xq|pq_centroids(k,l)) can be pre-calculated and stored, and the results can be queried later so that the repeated calculation can be greatly reduced, which improves the processing efficiency of the entire similar vector query process.

Based on the above findings, the inventor of the present application designed a method and an apparatus for querying in a candidate vector set candidate vectors similar to object vectors. The method and apparatus can pre-calculate and generate a plurality of common calculation results based on each batch of object vectors, a set of central vector portion $C_i$, and a set of residual vector portion Res of candidate vectors quantized in the candidate vector set, where each calculation result may include the expression represented by equation (2).

$$(xq-C_i)^2+(\text{Res})^2+2*(C_i|\text{Res}) \quad \text{equation (2)}$$

In some embodiments, the pre-generated common calculation results can be stored. Preferably, the common calculation results can be calculated offline in advance. In the subsequent querying process of similar vectors, the stored common calculation results can be called, therefore, only the last expression −2(xq|pq_centroids(k,l)) (or expressed as −2(xq|Res)) in equation (1) related to object vectors needs to be calculated.

As mentioned above, since the residual vector Res after the candidate vectors quantization is relatively certain, the last expression in equation (1) is usually called many times. Correspondingly, after receiving object vectors, the expression can also be calculated in advance as pre-calculation results and stored for use in the subsequent data processing. It can be understood that different from the common calculation denoted by equation (2), the expression −2(xq|Res) is related to the object vector xq, which is calculated online. In this way, when calculating the similarity between each candidate vector and object vector, it only requires querying the pre-calculated and stored common calculation result and pre-calculation result without repeating calculations, this simplifies complex vector calculation into querying operation, which effectively improves the calculation efficiency.

Based on the above findings, a method and an apparatus for querying in a candidate vector set candidate vectors similar to object vectors are disclosed.

FIG. 1 illustrates an apparatus 100 for querying in a candidate vector set candidate vectors similar to object vectors according to an embodiment of the present application.

As shown in FIG. 1, the query apparatus 100 includes a controller 102 for controlling the operation of other modules of the query apparatus 100, including the flow of data between different modules, to realize the calculation process of vector similarity querying.

The query apparatus 100 further includes one or more calculation modules 104 for respectively calculating the similarity between candidate vectors and object vectors in the candidate vector set and outputting calculation results of similarity. In some embodiments, the calculation module 104 may also perform other calculations related to similarity, such as calculating the distance between an object vector and each centroid in the candidate vector set or calculating the other expressions in equation (1). The calculation results based on the expressions are part of the similarity calculation results, such as common calculation results or pre-calculation results. In some cases, the common calculation results and pre-calculation results may be output by the calculation module 104, for example, to the sorting module 108.

In the IVF-PQ algorithm, the distance between each centroid and object vector can be calculated first, and the calculation result of distance is output to the sorting module 108 and the sorting module 108 determines the nearest N centroids to the object vector by sorting. (that is, top N centroids).

TABLE 1

An example of the distance between object vectors and the candidate vectors

| object vector | candidate vector subset 1 C1 | | | candidate vector subset 2 C2 | | | candidate vector subset 3 C3 | | | candidate vector subset 4 C4 | | |
| --- | --- | --- | --- | --- | --- | --- | --- | --- | --- | --- | --- | --- |
| | v11 | v12 | v13 | v21 | v22 | v23 | v31 | v32 | v33 | v41 | v42 | v43 |
| xq_1 | topN | topN | topN | topN | topN | topN | | | | | | |
| xq_2 | topN | topN | topN | | | | topN | topN | topN | | | |
| xq_3 | | | | topN | topN | topN | topN | topN | topN | | | |

TABLE 1-continued

An example of the distance between object vectors and the candidate vectors

| object | candidate vector subset 1 C1 | | | candidate vector subset 2 C2 | | | candidate vector subset 3 C3 | | | candidate vector subset 4 C4 | | |
|---|---|---|---|---|---|---|---|---|---|---|---|---|
| vector | v11 | v12 | v13 | v21 | v22 | v23 | v31 | v32 | v33 | v41 | v42 | v43 |
| xq_4 | topN | topN | topN | topN | topN | topN | | | | | | |
| xq_5 | | | | topN | topN | topN | topN | topN | topN | | | |
| ... | | | | | | | | | | | | |
| xq_R | | | | | | | | | | | | |

As shown in Table 1, suppose that the candidate vector set can be divided into four candidate vector subsets 1 to 4, where each candidate vector subset is associated with one of the centroids C1 to C4, and may have a different number of candidate vectors. For example, the centroid of candidate vector subset 1 is C1 and includes three candidate vectors v11 to v13; the centroid of candidate vector subset 2 is C2 and includes three candidate vectors v21 to v23; and so on. It can be understood that, in this example, the number of candidate vector subsets in the candidate vector set and the number of candidate vectors in each subset are exemplary and may have other different values in practical applications. In general, the number of candidate vectors in each candidate vector set is significantly more than the number of the most similar vectors that need to be determined later, and the number of candidate vector subsets (centroids) varies depending on the practical applications. For example, when querying a most similar picture to a picture of a pet dog from a pet picture data set, for example, 500,000 pet pictures, different types of pets can be divided into different candidate vector subsets, then the number of candidate vector subsets mainly depends on the type of pets, and may only include a few; for example, when querying a most similar product to a product from a data set, for example, 50 million candidate products, and 50 million candidate products may be divided into hundreds of candidate vector subsets, which mainly depends on the number of candidate products based on the combination of types, prices, and various characteristics of the seller.

Still referring to FIG. 1, calculation module 104 may be coupled to the memory module 106 to receive candidate vectors and object vectors. In some embodiments, the memory module 106 may include two or more parts: the first part of memory module 106 is used to cache candidate vectors and the object vectors to provide to the calculation module 104 and the second part of memory module 106 can provide a cache area when the calculation module 104 performs calculation. It can be understood that, in some embodiments, the first part and the second part of the memory module 106 may be dynamically defined, that is, the first part may be used to cache vectors and the second part may be used to provide a calculation cache area in the first time period. The first part may be used to provide a calculation cache area and the second part may be used to cache vector in the second period after completing the calculation of the first period, which can be alternated. The processing method can improve the processing efficiency of the apparatus 100.

As mentioned above, the calculation module 104 is also coupled to the sorting module 108 to output similarity calculation results or other intermediate calculation results to it. In some embodiments, a plurality of calculation modules 104 may be coupled in parallel between the memory module 106 and the sorting module 108 to process data in parallel, which improves the speed of calculation and processing of the query apparatus 100. Specifically, multiple parallel computing modules 104 improves the capability of parallel computing. If the data input to the calculation module 104 can be reused every time, and the calculation modules 104 can share the data received from the sorting module 108, unnecessary repeated data input/output can be reduced. In other words, the parallel calculation modules 104 divide the similarity calculation task into several smaller subtasks, and each subtask can be processed by different calculation modules 104. In this way, the query apparatus 100 can run multiple similarity calculation tasks required by upper-level software at the same time, which improves the operating efficiency.

In some embodiments, the sorting module 108 may be a scalable sorting module, it may be configured to work in different sorting modes. "Scalable" specifically means that the sorting module includes multiple identical or similar sub-modules, and the number of sub-modules for sorting can be changed by modifying the serial/parallel coupling between these sub-modules, thereby realizing sorting processing of different scales. For example, in a sorting application with the IVF-PQ algorithm, the mode of the sorting module 108 may be configured as top 2k sorting, top 4k sorting, top 8k sorting, and other sorting modes, that is, the top 2k vectors and the top 4k vectors or the top 8k vectors can be determined by sorting. In some embodiments, in order to achieve a scalable setting, the sorting module 108 and the calculation module 104 may be configured to be capable of two-way data interaction. For example, after the calculation result of the calculation module 104 is sorted by the sorting module 108, it is optionally returned to the calculation module 104 for the next calculation process. The sorting mode can be set by, for example, a toggle switch, a data multiplexer, or a similar switching module. The specific setting and switching off the sorting mode will be described in detail below.

Next, taking the similarity calculation shown in equation (1) as an example, with reference to Table 1, the process of executing the IVF-PQ algorithm by the query apparatus 100 shown in FIG. 1 is further described.

As mentioned above, the object vectors are usually received in batches, and each batch may include a plurality of object vectors, such as the five object vector xq_1, xq_2 . . . xq_5 of the first batch. For each object vector, the query apparatus 100 can traverse each centroid in the candidate vector set, and the first expression $(xq-C_i)^2$ of equation (1) is calculated in calculation module 104 that is, the distance between object vectors and the center of each cluster can be calculated in calculation module 104. After traversing all the centroids, the calculation module 104 can provide the calculation results to the sorting module 108, which sorts and determines the N centroids that are closest to object vectors (2N or other numbers, depending on sorting mode of the sorting module 108).

Referring to Table 1, five object vectors xq_1 to xq_5 are input in a batch process, and the distance relationship between five object vectors and different centroids are different: the two centroids that are closest to object vector xq_1 are C1 and C2 (that is, top N equals to top 2), the two centroids closest to object vector xq_2 are C1 and C3, the two centroids closest to object vector xq_3 are C2 and C3, the two closest centroids to object vector xq_4 are C1 and C2, and the two closest centroids to object vector xq_5 are C2 and C3. Therefore, when performing the similarity calculation, it requires calculating the similarity between the candidate vector in the candidate vector subset corresponding to the closest two centroids and object vectors. It can be understood that the distance relationship between the centroids and object vectors are only exemplary. In actual processing, the N (or other numbers) centroids that are closest to object vectors may be different. And the number of candidate vectors in the vector subset corresponding to each centroid may also be different.

The sorting result sorting by the sorting module 108 (for example, the closest N or other number of centroids) may be stored in the register of the sorting module 108 and then provided to the control module 102. In some embodiments, the control module 102 may determine object vectors related to each candidate vector subset according to the sorting result stored in the register of the sorting module 108, and then calculate the similarity of object vectors in the candidate vector subset. It can be understood that object vectors closest to each centroid may also be different. For example, in the example shown in Table 1, the object vectors close to the centroid C1 are the object vectors xq_1, xq_2, and xq_4, and the object vectors close to the centroid C2 are the object vectors xq_1, xq_4, and xq_5, which are similar to the centroid C2, the object vector close to the centroid C3 is object vector xq_3, and the centroid C4 has no close to object vectors. The similarity calculation based on the subset of candidate vectors instead of object vectors can share the pre-calculation results, which improves the calculation efficiency After determining the closest multiple centroids (subsets of candidate vectors), the apparatus 100 can calculate the similarity of each candidate vector in the subsets of candidate vectors and the object vectors received in the same batch according to equation (1).

Specifically, as mentioned above, in the calculation of similarity, the common calculation results corresponding to the first, second and third expressions in equation (1) (i.e., equation (2)) can be pre-calculated by the module 104 and can be sent and stored in a cache (for example, the cache 144 shown in FIG. 2) after processing by the sorting module for subsequent processing calls. Then, for each object vector, the calculation module 104 calculates the last expression $-2(xq|pq\_centroids(k,l))$ in equation (1) related to object vector and the residual vector and generates a pre-calculation results table. Therefore, for five object vectors, the query apparatus 100 can pre-calculate and generate five corresponding pre-calculation result tables. The calculation module 104 may store all the generated pre-calculation result tables for subsequent processing. In some embodiments, the calculation module 104 may store the pre-calculation result tables in its cache 118.

In this way, the common calculation results related to the first three expressions and the pre-calculation results related to the last expression in equation (1) have been pre-calculated and stored. Among them, the pre-calculation result related to the last expression can be stored as a look-up table to be called.

The calculation module 104 may use the pre-stored calculation result to calculate the similarity between each object vector and candidate vector. Specifically, the calculation module 104 may query the corresponding pre-calculation result in the pre-calculation result table according to object vectors in each candidate vector subset determined by the control module 102, and then accumulate the pre-calculation results and the corresponding common calculation results after querying. Still referring to the example shown in Table 1, for candidate vector subset 1, three candidate vectors v11 to v13 each have a corresponding residual vector portion. When calculating the similarity between v11 and object vector xq_1, the value of the last expression in Equation (1) can be searched based on the residual vector portion of the candidate vector v11, in the pre-calculation result table generated by the object vector xq_1 and the all the residual vector portions in the candidate vector subset 1. And then the value is accumulated with other common calculation results to obtain the similarity between the object vector xq_1 and the candidate vector v11. Similarly, when calculating the similarity between v12 and object vectors xq_1, in the pre-calculation result table generated by the object vector xq_1 and the all the residual vector portions in the candidate vector subset 1, the value of the last expression in Equation (1) can be searched based on the residual vector of the candidate vector v12, and the value is then accumulated with other common calculation results.

It can be seen that vector multiplication calculations that originally consume a lot of resources are converted to look-up table calculations with pre-stored common calculation results and pre-calculation results, which can reduce a large number of repeated calculation and effectively improve the querying speed.

Still referring to FIG. 1, the calculation module 104 may include a data interface 110, which serves as an interface for mutual data exchange between the calculation module 104 and the memory module 106. In some embodiments, the type of the data interface 110 may be designed to fit the interface type of the memory module 106. Optionally, the data interface 110 may also be coupled to the sorting module 108 for receiving data from the sorting module 108, such as various sorting results.

The calculation module 104 includes a calculation processor 112 for performing calculation processing on the data provided by the data interface 110. For example, the calculation processor 112 may include one or more adders, multipliers, and accumulators to implement various required calculation processes. In some embodiments, the computing processor 112 may include a plurality of computing threads coupled in parallel, and each computing thread may include an adder, a multiplier, and an accumulator coupled in series. The computing processor 112 may also include one or more caches for caching data from the data interface 110. The calculation processor 112 may further include a register 116, which may configure configuration parameters for calculation process, state variables or store common calculation results or pre-calculation results. The calculation result generated by the calculation processor 112 may be stored in the cache 118 and then may be provided to the sorting module 108.

The calculation module 104 also includes a decoding calculator 114, which may be configured to include one or more look-up tables. For example, the pre-calculation results table generated by the calculation processor 112 may be provided to the decoding calculator 114 and stored in the form of a look-up table. After being inquired, the decoding calculator 114 can provide the selected decoding results to the sorting module 108. Compared with the use of calculation processors similar to the calculation processor 112 to perform addition, multiplication, and accumulation operations, the advantage of the decoding calculator 114 (perform operations with look-up table) is that the results of generating the look-up table will essentially cause the data to be compressed. In other words, after encoding the lookup table, the data is assigned the corresponding identifier or number that are transmitted in the subsequent calculation process only so that less data are transmitted in the calculation module 104, which greatly saves the time for data transmission and the storage resources for storing the data in the computing module 104. In addition, it should be noted that although the process of the decoding calculator 114 for the decompression operation also requires processing time, it saves time and resources in the application scenario of vector phase velocity calculation.

As described above, the candidate vectors and object vectors are encoded by the IVF-PQ algorithm or similar algorithms, and are converted into corresponding shorter vectors, and each element in the vector is also compressed from the longer data format to the shorter data format (for example, from 32-bit floating point data format to 8-bit character data format). The data format conversion makes each element in the compressed vector correspond to a feature, and these features also exist in other vectors. In this way, the same features of different vectors can have the same results in subsequent calculations. In other words, there are parts that can be shared in the calculation of many vectors in the subsequent calculation process, that is, many calculations only need to be calculated once, for example, pre-stored in a lookup table for subsequent calls. Therefore, the function of the decoding calculator 114 is not only to restore the data, but also to perform corresponding calculations.

Figure 2:
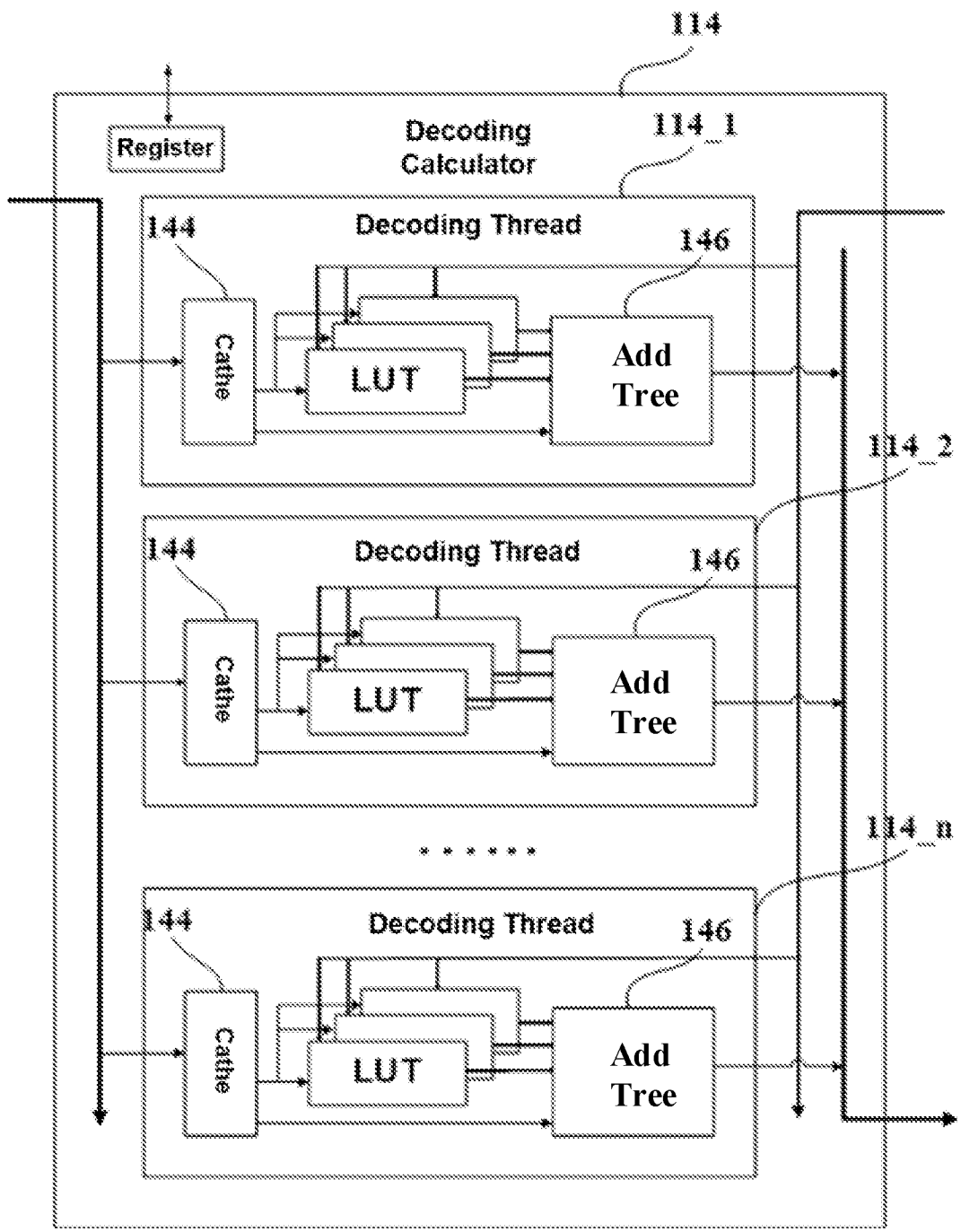
FIG. 2 shows an example of a decoding calculator 114 in the query apparatus 100 shown in FIG. 1.

FIG. 2 shows an example of a decoding calculator 114 in the query apparatus 100 shown in FIG. 1.

As shown in FIG. 2, the decoding calculator 114 may include a plurality of decoding threads 142_1, 142_2 . . . 142_n coupled in parallel, wherein each decoding thread may be used to respond to a decoding query request to provide a corresponding pre-calculation result, and multiple coupled decoding threads can effectively improve decoding efficiency. In some embodiments, the look-up table in each decoding thread may include the same pre-calculation result table, so that different decoding threads can process decoding query requests in parallel, which improves querying and data processing speed. For example, for object vectors in the same batch, a set of pre-calculation result tables corresponding to the object vectors may be generated in advance, and each set of pre-calculation result tables will be stored in each decoding calculator 114. In this way, during subsequent query processing, different candidate vectors can be provided to the decoding calculators in different calculation modules 104, so as to compare these candidate vectors with object vectors in parallel.

In some embodiments, each decoding thread may further include a cache 144 and an add tree 146, where the cache is used for caching data, such as the values of the first three expressions in equation (1); and the add tree 146 is used for calculating the results output by lookup tables and the sum of it and the first three expressions. In this way, the add tree 146 can directly output the similarity calculation result to the sorting module coupled with it.

Figure 3:
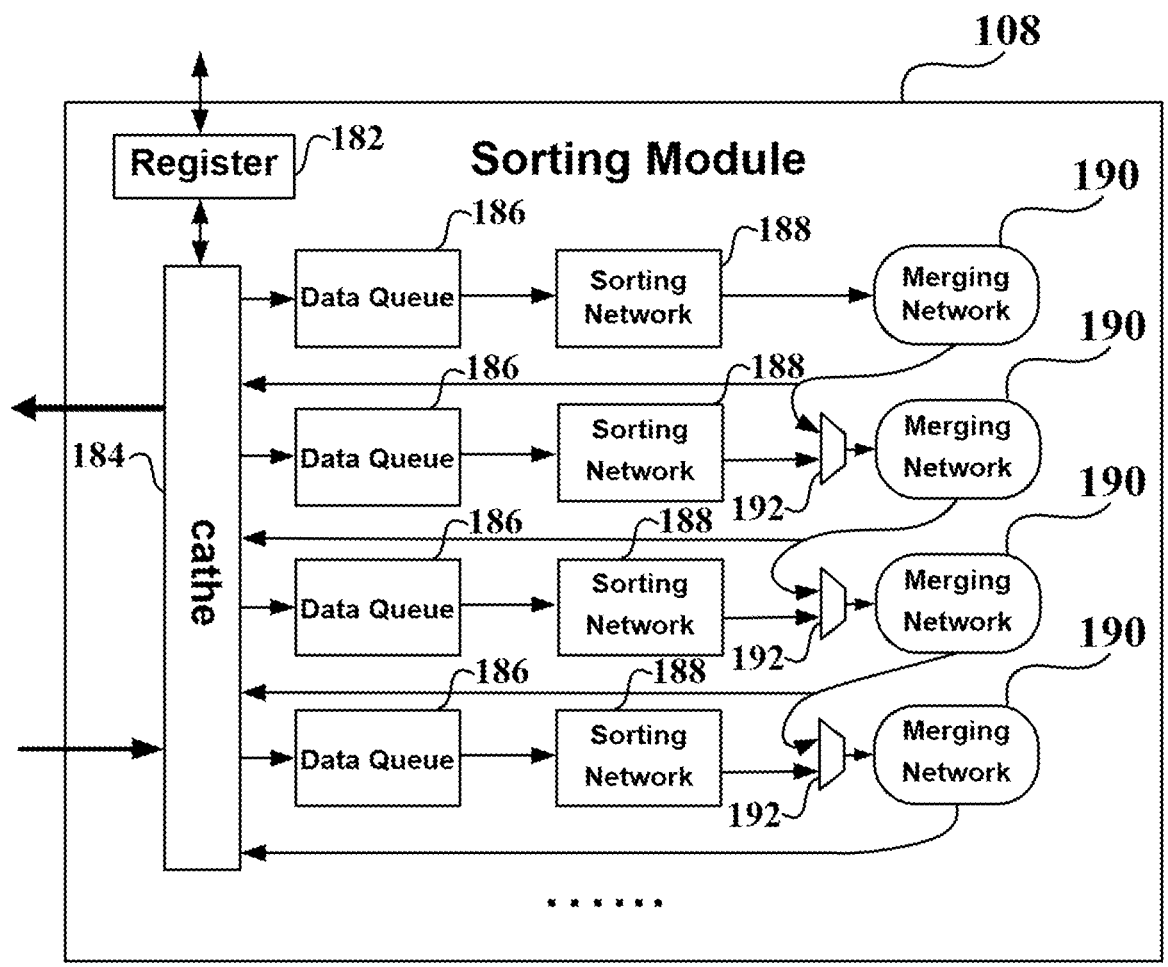
FIG. 3 shows an example of a sorting module 108 in the query apparatus 100 shown in FIG. 1.

FIG. 3 shows an example of a sorting module 108 in the query apparatus 100 shown in FIG. 1.

As shown in FIGS. 1 and 3, the sorting module 108 may include a register 182, a cache 184, a plurality of data queues 186, a plurality of sorting networks 188, a plurality of merging networks 190, and a plurality of data multiplexers 192. Among them, the register 182 stores configuration parameters, data, and some calculation results. The sorting network 188 sorts of the received M data, and the merging network can receive 2 or more sets of M data and sort them together. In some embodiments, the register 182 may be coupled to the controller 102 to receive configuration parameters therefrom, and to perform sequencing under the control of the controller 102. The cache 184 is coupled to the calculation module 104, for example, to the data interface 110 of the calculation module 104, the decoding calculator 114 and the cache 118. Then, the sorting module 108 can provide the sorting results to the data interface 114 of the calculation module 104 and the similarity calculation results output by the decoding calculator 114 and the calculation processor 112 (via the cache 118) is received.

Each data queue 186, sorting network 188, and merging network 190 of the sorting module 108 are coupled in series to sort the received similarity calculation results. In some embodiments, the data queue 186 may be set as a first-in first-out queue. In practical applications, the sorting network 188 is usually a hardware device with specific sorting capabilities. For example, the sorting network 188 may be a top 2k sorting network, which can sort vectors and determine the first 2k vectors; Accordingly, the merge network 190 and the data multiplexer 192 coupled between the partial sorting network 188 and the corresponding merging network 190 merge the sorting results of the vectors, so that the top 2k sorting network is expanded to a top 4k sorting network, a top 8k sorting network or a larger-scale sorting network. In other words, the sorting mode of the sorting module 108 can be configured. The sorting module 108 as shown in FIG. 3 can be configured as 4 sets of top 2k sorting networks, and its data flow is input from the cache 184 and then processed by the data queue 186, sorting network 188, and the data multiplexer 192 (the first row may not include the data multiplexer 192) and the merge network 190 as shown in FIG. 3, the result is returned to the cache 184 for output, where the data multiplexer 192 can also be replaced by a switch or similar selection/switching module; Optionally, the sorting module 108 can also be configured as two sets of top 4k sorting networks, the data flow is, for example, processed through the first row data queue 186, the sorting network 188 and the merging network 190 as shown in FIG. 3 after being input from the cache 184, and the first row of merge network 190 is provided to the second row of data multiplexer 192, so that the multiplexer 192 can selectively output the results from the first row of merging network 190 and the second row of sorting network 188, and then processed by the second row of merge network 190 to merge the two sets of results, thereby realizing the sorting processing of top 4k sorting network. Optionally, the sorting module 108 can also be configured as a set of top 8k sorting network, its data flow is to merge the sorting results of the first 4 rows. Those skilled in the art can understand that, in some embodiments, the sorting module can be configured in other sorting modes according to actual application conditions. For example, it can be configured as a combination of multiple sets of top 2k sorting networks, multiple sets of top4k sorting networks, or other scales of sorting networks.

In other embodiments, one or more of the sorting networks 188 or the merging networks 190 may also be bypassed, so that only sorting or only merging is performed. For example, the merging network 190 can be bypassed, so that the sorting network 188 can directly output the sorting result to and output by the cache 184; for another example, the sorting network 188 can be bypassed, so that the data queue 186 can directly provide data to the merging network 190 for merging by the merge network 190.

In some embodiments, the output of each merging network 190 can also be coupled to its input, so that the operation result of the merging network can be selectively provided to its input.

The merging network is used in the sorting module 108 because for the sorting of two ordinal numbers, the merging network occupies less resources and the processing time is shorter. For example, in order to sort two sequences with a length of 10, a sorting network with input and output of 10 can be used. However, a sorting network of this size is larger than a merge network with input and output of 10 and has more processing stages. The calculation time is also longer. Therefore, the use of the merge network is beneficial to improve the processing speed of sorting, and even the processing speed of the entire similar vector query.

Figure 4:
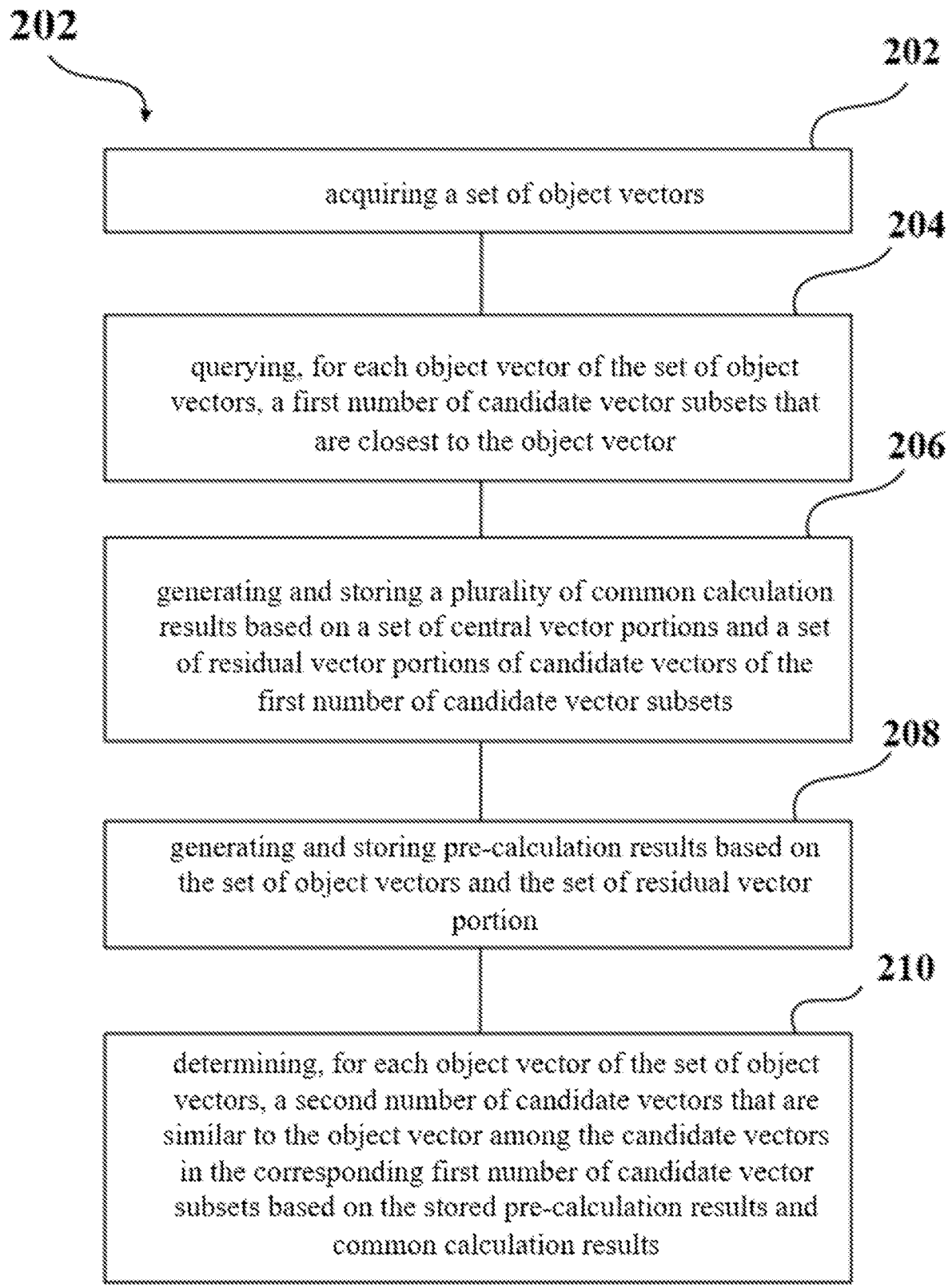
FIG. 4 shows a method 200 for querying in a candidate vector set candidate vectors similar to object vectors according to an embodiment of the present application.

FIG. 4 shows a method 200 for querying in a candidate vector set candidate vectors similar to object vectors according to an embodiment of the present application, wherein the candidate vector set comprises a plurality of candidate vectors each being quantized as having a center vector portion and a residual vector portion, and the candidate vector set comprises a plurality of candidate vector subsets.

As shown in FIG. 4, the method 200 includes: at S202, acquiring a set of object vectors. At S204, for each object vector of the set of object vectors, querying a first number of candidate vector subsets that are closest to the object vector. At S206, generating and storing a plurality of common calculation results based on a set of center vector portions and a set of residual vector portions of candidate vectors of the first number of candidate vector subsets. At S208, generating and storing pre-calculation results based on the set of object vectors and the set of residual vector portion. And at S210, determining, for each object vector of the set of object vectors, a second number of candidate vectors that are similar to the object vector among the candidate vectors in the corresponding first number of candidate vector subsets based on the stored pre-calculation results and common calculation results.

In some embodiments, the generation of the plurality of common calculation results is performed offline, and the generation of the pre-calculation results is performed online.

In some embodiments, the pre-calculation results are stored as a pre-calculation result table in the form of a look-up table.

In some embodiments, the steps for calculating a second number of candidate vectors that are similar to each object vectors in the object vectors: calculating, for each object vector, respective distances between the object vector and the candidate vectors in the corresponding first number of candidate vector subsets and sorting the candidate vectors based on the calculated distances, to determine a second number of candidate vectors that are closest to the object vector as the second number of candidate vectors that are similar to the object vector.

In some embodiments, each of the central vector portions, the residual vector portions, and the object vectors are all divided into M segments using IVF-PQ algorithm, wherein M is a natural number greater than 1, and a common calculation result is expressed as: $(xq-C_i)^2+(pq\_centroids(k,l))^2+2*(C_i|pq\_centroids(k,l))$, wherein xq denotes an object vector, and pq_centroids(k,l) denotes a residual vector portion, l denotes the l-th segment of a residual vector portion, l=1 . . . M, and k denotes a the quantized value of the l-th segment; Ci denotes the i-th central vector portion associated with a candidate vector, and i is a natural number.

In some embodiments, a pre-calculation result is expressed as: $-2(xq|pq\_centroids(k,l))$.

It should be noted that although several modules or sub-modules, steps or sub-steps of the method and apparatus for querying similar vectors in the candidate vector set are mentioned in the above detailed description, the division is only exemplary and not mandatory. In fact, according to the embodiments of the present application, the features and functions of two or more modules described above can be embodied in one module. Conversely, the features and functions of a module described above can be further divided into multiple modules to be embodied.

A person of ordinary skill in the art can understand and implement other changes to the disclosed embodiments by studying the description, the content of the disclosure, the drawings, and the appended claims. In the claims, the word "comprise" does not exclude other elements and steps, and the word "a" and "an" do not exclude plurals. In the actual application of this application, one part may perform the functions of multiple technical features cited in the claims. Any reference numbers in the claims should not be construed as limiting the scope.

What is claimed is:

1. A method for querying in a candidate vector set candidate vectors similar to object vectors, wherein the candidate vector set comprises a plurality of candidate vectors each being quantized as having a central vector portion and a residual vector portion, and the candidate vector set comprises a plurality of candidate vector subsets, the method comprising:

acquiring a set of object vectors;

querying, for each object vector of the set of object vectors, a first number of candidate vector subsets that are closest to the object vector;

generating and storing a plurality of common calculation results in a cache based on a set of central vector portions and a set of residual vector portions of candidate vectors of the first number of candidate vector subsets;

generating and storing pre-calculation results as a pre-calculation result table in the form of a look-up table based on the set of object vectors and the set of residual vector portion; and determining, for each object vector of the set of object vectors, a second number of candidate vectors that are similar to the object vector among the candidate vectors in the corresponding first number of candidate vector subsets based on the stored pre-calculation results and common calculation results, wherein generating the plurality of common calculation results is performed offline and generating the pre-calculation results is performed online;

wherein each of the central vector portions, the residual vector portions and the object vectors are divided into M segments using IVF-PQ algorithm, wherein M is a natural number greater than 1, and a common calculation result is expressed as: $(xq-C_i)^2+(pq\_centroids(k,l))^2+2*(C_i|pq\_centroids(k,l))$, wherein xq denotes an object vector, and pq_centroids (k, l) denotes a residual vector portions, l denotes an l-th segment of a residual vector portion, l=1 . . . M, and k denotes a quantized value of the l-th segment of a residual vector portion;

Ci denotes the i-th central vector portion associated with a candidate vector, and i is a natural number; and wherein a pre-calculation result is expressed as: $-2(xq|pq\_centroids(k,l))$.

2. The method according to claim 1, wherein the step for determining, for each object vector of the set of object vectors, a second number of candidate vectors that are similar to the object vector among the candidate vectors in the corresponding first number of candidate vector subsets based on the stored pre-calculation results and common calculation results comprises:

calculating, for each object vector, respective distances between the object vector and the candidate vectors in the corresponding first number of candidate vector subsets; and sorting the candidate vectors based on the calculated distances, to determine a second number of candidate vectors that are closest to the object vector as the second number of candidate vectors that are similar to the object vector.

3. A similarity query apparatus for querying in a candidate vector set candidate vectors similar to object vectors, wherein the candidate vector set comprises a plurality of candidate vectors each being quantized as having a central vector portion and a residual vector portion, and the candidate vector set comprises a plurality of candidate vector subsets, the similarity query apparatus comprising:

a calculation module for calculating respective distances between an object vector and the plurality of candidate vectors subsets, and for calculating respective similarities between candidate vectors and an object vector; and a sorting module for sorting the distances between an object vector and the plurality of candidate vector subsets, and for sorting the similarities between candidate vectors and an object vector;

wherein the calculation module performs the calculating of distances and similarities through the following steps:

acquiring a set of object vectors; and for each object vector of the set of object vectors:

calculating respective distances between the object vector and the candidate vector subsets and providing the distances to the sorting module;

generating and storing a plurality of common calculation results in a cache based on a set of central vector portions and a set of residual vector portions of the candidate vectors of a first number of candidate vector subsets that are closest to the object vector;

generating and storing pre-calculation results as a pre-calculation result table in the form of a look-up table based on the set of object vectors and the set of residual vector portions; and determining a second number of candidate vectors that are similar to the object vector among the candidate vectors in the corresponding first number of candidate vector subsets based on the stored pre-calculation results and common calculation results;

wherein generating the plurality of common calculation results is performed offline and generating the pre-calculation results is performed online;

wherein each of the T, the residual vector portions and the object vectors are divided into M segments using IVF-PQ algorithm, wherein M is a natural number greater than 1, and a common calculation result is expressed as: $(xq-C_i)^2+(pq\_centroids(k,l))^2+2*(C_i|pq\_centroids(k,l))$, wherein xq denotes an object vector, and pq_centroids (k, l) denotes a residual vector portions, l denotes an l-th segment of a residual vector portion, $l=1 \ldots M$, and k denotes a quantized value of the l-th segment of a residual vector portion; Ci denotes the i-th central vector portion associated with a candidate vector, and i is a natural number; and wherein a pre-calculation result is expressed as: $-2(xq|pq\_centroids(k,l))$.

4. The apparatus according to claim 3, wherein the calculation module comprises:

a calculation processor for performing calculation on data received by the calculation module; and a decoding calculator for receiving and storing the pre-calculation results calculated by the calculation processor, searching for corresponding pre-calculation results in response to a decoding query request, calculating respective distances between an object vector and candidate vectors based on the pre-calculation results and the common calculation results, and determining the distances as similarity calculation results for the candidate vectors.

5. The apparatus according to claim 4, wherein the decoding calculator comprises one or more decoding threads, and each of the decoding threads comprises:

a cache for caching data;

a plurality of lookup tables for storing respective pre-calculation results corresponding to the object vectors; and an add tree for summing data.

6. The apparatus according to claim 3, wherein the sorting module comprises:

a plurality of data queues, a plurality of sorting networks, and a plurality of merging networks, wherein each data queue is coupled in series with a sorting network and merging network for sorting similarity calculation results received thereby.

7. The apparatus according to claim 6, wherein the sorting module comprises:

a plurality of data multiplexers each being configured for selectively coupling an output of a merging network to an input of another merging network to merge similarity calculation results of the two merging networks.

8. The apparatus according to claim 7, wherein each merging network is further coupled to the calculation module to provide the first number of candidate vector subsets that are closest to the object vector.

\* \* \* \* \*